May 1, 1934. R. S. OLIVER 1,956,652
BIRD CAGE PERCH
Filed Oct. 16, 1931
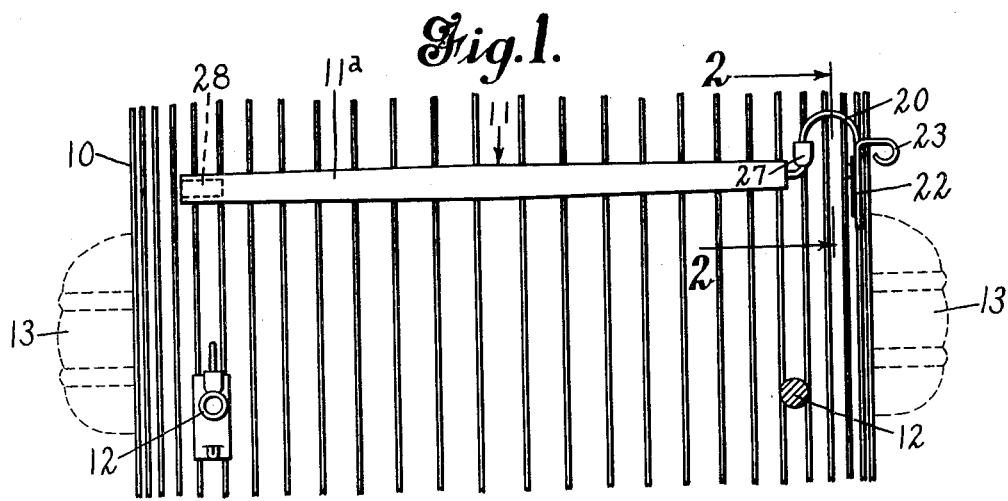
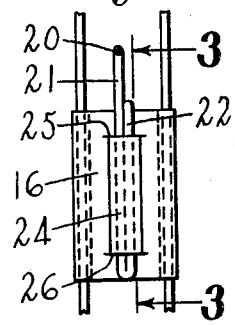
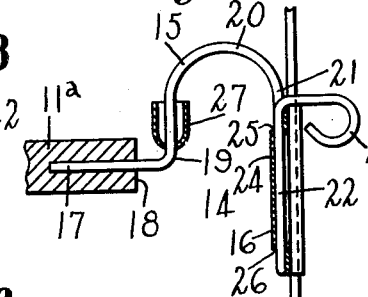
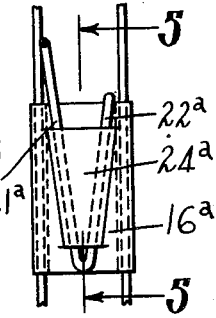
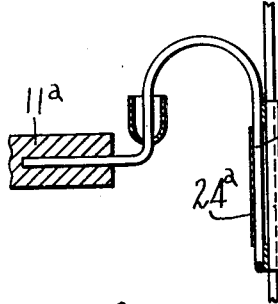
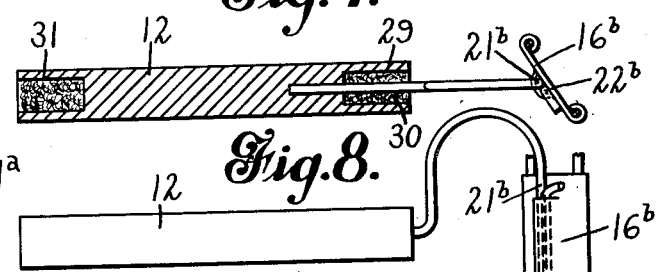
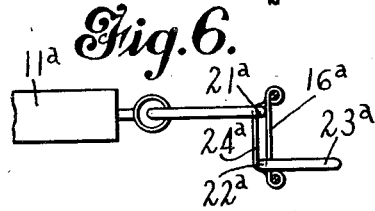
Inventor
Robert S. Oliver
By Robert A. Batchelor
Attorneys Patented May 1, 1934

1,956,652

UNITED STATES PATENT OFFICE 1,956,652

BIRD CAGE PERCH

Robert S. Oliver, New Haven, Conn., assignor to The Andrew B. Hendryx Company, New Haven, Conn.

Application October 16, 1931, Serial No. 569,227

5 Claims. (Cl. 119—26)

This invention relates to perches for bird cages.

One of the objects of the invention is to provide a perch having a spring mounting of such a character that the perch swings or yields under the movements of the bird in much the same manner as a small branch or twig of a tree, the spring mounting being such that the perch can be readily and economically manufactured and readily installed in the cage and removed therefrom.

Another object is to furnish a spring perch which can be very readily manipulated so that the user can conveniently place it in the proper position in the cage body and remove it therefrom, and wherein, nevertheless, the perch when positioned in the cage body will be firmly and securely held in place until such time as it is desired to remove the same from the cage.

Another object is to provide a perch having improved means for keeping the bird free of mites.

To these and other ends the invention consists in the novel features and combinations of parts to be hereinafter described and claimed.

In the accompanying drawing:

Fig. 1 is a fragmentary elevation partially in section of a bird cage having perches constructed and arranged in accordance with my invention;

Fig. 2 is an enlarged section on line 2—2 of Fig. 1;

Fig. 3 is a section on line 3—3 of Fig. 2;

Figs. 4, 5 and 6 are detail views showing another form of spring mounting, Fig. 5 being a section on line 5—5 of Fig. 4 and Fig. 6 being a top plan view of the parts shown in Fig. 5;

Fig. 7 is a sectional view illustrating in further detail one of the lower or feed perches shown in Fig. 1; and Fig. 8 is a side elevation of the device shown in Fig. 7.

In Fig. 1 I have shown a portion of an ordinary wire cage body 10 having in the upper part thereof a so-called main perch generally indicated by reference character 11, and in the lower part thereof two feeding perches, each generally designated by reference character 12, and each located adjacent one of the feed cups 13 with which the cage is equipped. In Figs. 2 and 3 I have shown details of the mounting of the main perch, and in Figs. 7 and 8 I have shown details of the mounting of the feed perches.

In constructing the perch 11 I prefer to use a body 11ª of wood in substantially the usual form, and it will be observed that this body is connected with the cage body by a spring mounting generally indicated at 14, this mounting being located at one end of the perch body and the other end of the perch body being entirely free and unsupported, the character of the spring mounting being such as to give the perch the requisite flexibility. I prefer to form the spring mounting of a member 15 of brass or other spring wire adapted for detachable engagement with a mounting clip 16 mounted and fixed on the side wall of the cage body. Preferably the wire 15 has a terminal portion 17 extending into and firmly held in a socket opening at the end face 18 of the perch body. A bend 19 is formed in the wire and the latter provided at its upper part with a loop-shaped portion 20. At one side of this loop-shaped portion 20 is a depending leg portion 21, and from this leg portion 21 the wire is continued and bent upwardly so as to provide an upwardly extending leg portion 22 parallel to and in substantial contact with leg portion 21. At the top of leg portion 22 the wire is bent laterally and away from the loop 20 and from the adjacent end of the perch body so as to form a small loop portion 23, which is preferably located in a vertical plane approximately in line with the end of the perch body. The mounting clip 16 previously mentioned may be conveniently formed of a brass plate having its side edges bent around and soldered to two adjacent wires of the cage. On the inner face of the clip there is provided an integral keeper 24 formed by punching out a portion of the body of the clip plate, said keeper 24 being open at the top, as indicated at 25, and also open at the bottom, as indicated at 26, so that said keeper may receive the leg portions 21, 22. These leg portions are firmly socketed in the keeper side by side and the keeper is of such a width as to hold the two leg portions firmly together, and their upper portions are in contact with the inner face of the clip plate and their lower portions, which extend downwardly beyond the keeper, are also in contact with the inner surface of the clip plate. In this manner a very firm support is provided for the mounting spring in the cage body and yet the perch can be easily installed in and removed from the cage, owing to the fact that the shank portion of the mounting spring, which is fairly stiff as a result of the fact that the spring is bent upon itself to form the two leg portions disposed side by side, can be very readily engaged with and disengaged from the upwardly facing socket presented by the keeper of the mounting plate. The perch can, in fact, be manipulated from the exterior of the cage because it is for this purpose that the loop portion 23, previously described, is provided, which loop portion projects out past the cage wires and presents an exterior projection by grasping and manipulating which the perch can be lowered into operative position or lifted from operative position to disengage it from the mounting plate and permit its removal from the cage.

In order to prevent mites from passing from the cage body to the perch, I may mount upon that upwardly extending leg of loop 20 which is adjacent the end of the perch body a small cup 27 adapted to hold a liquid insecticide. This cup can be conveniently made of brass or copper, and it has a perforation in the bottom thereof through which the spring wire passes, the bottom of the cup being soldered to the wire where it surrounds the same. I also prefer to provide the other end of the perch body with means for trapping the mites so that after the latter have removed from the bird (as occurs at certain periods) they may be caught and destroyed. With this in view, I may provide the outer or remote end of the perch body with a socket 28, as indicated by the dotted lines in Fig. 1, which socket will form a retreat for the mites and from which they can be removed in a suitable manner after the perch has been taken out of the cage.

In the form shown in Figs. 4, 5 and 6, the spring mounting is constructed upon the same general principles hereinbefore described, but in this instance the leg portions 21ª and 22ª of the metallic connection between the perch body and the mounting clip, instead of being arranged in parallelism and in close proximity, are disposed so that they form between them an acute angle, thus presenting a member pointed toward its lower end adapted to engage a wedge-shaped keeper 24ª on the mounting clip 16ª. The spring wire is tensioned so that the legs 21ª, 22ª are yieldingly held in engagement with the side walls of the keeper 24ª. In this form, the shank portion of the mounting is very firmly held against dislocation, and yet the perch can be very readily removed from operative position when this is desired, owing to the fact that the sides of the shank yieldingly engage the sides of the wedge-shaped keeper and can be very readily disengaged therefrom by grasping and manipulating the exteriorly projecting loop 23ª, which is a continuation of leg 22ª.

In the feeding perch construction shown in Figs. 7 and 8 the mounting is generally similar to those previously described. In this case the mounting plate 16ᵇ is at an angle to the longitudinal axis of the perch which is other than a right angle, and the legs 21ᵇ and 22ᵇ (which in this case are parallel to each other) lie in a plane which is parallel to that of plate 16ª. In this case the exteriorly projecting manipulating loop is omitted. In this particular case, also, the cup for holding insecticide is not shown, but the perch body is provided with an end socket 29 surrounding the mounting wire adapted to be filled with cotton or the like (30) to trap the mites, and at the opposite end of the perch body a similar socket 31 is provided.

It will be apparent that my improved perch has a resilient mounting of such character that it simulates the branch or twig of a tree and yet the construction is very simple and economical and the perch can be very easily placed in and removed from its position in the cage.

While I have shown a number of forms which my invention may take, it is to be understood that I have not attempted to illustrate or to describe all of the modifications which may be made without departing from the scope of my invention as defined in the claims.

What I claim is:

1. In a bird cage, the combination with the cage body, of a mounting plate attached to the wall of the cage body at one side thereof and having a keeper presenting a vertically facing socket, a perch body located within the cage body, and a spring support for the perch body comprising a spring wire connected at one end to the perch body at one end of the latter and having a doubled portion presenting a shank adapted to be inserted within the upwardly facing socket of the keeper, the doubled portion of the spring wire being located intermediate the ends of the wire and comprising leg portions arranged in a common plane and adapted to be located side by side in the keeper, the other end of the wire being bent to form a manipulating member and projecting outside of the cage body.

2. In a bird cage, the combination with the cage body, of a mounting plate attached to the wall of the cage body at one side thereof and having a keeper presenting a vertically facing socket having downwardly converging side walls, a perch body located within the cage body, and a spring support for the perch body comprising a spring wire connected to the perch body at one end of the latter and having a doubled portion presenting a shank adapted to be inserted within the upwardly facing socket of the keeper, the doubled portion of the spring wire being located intermediate the ends of the wire and comprising leg portions arranged in a common plane and adapted to be located side by side in the keeper, said leg portions being disposed so as to create an acute angle between them and to engage the side walls of the keeper.

3. In a bird cage, the combination with the cage body of a mounting plate attached to the wall of the cage body at one side thereof and having a keeper presenting a vertically facing socket, a perch body located within the cage body, and a spring support for the perch body comprising a spring wire, one end of which is connected to one end of the perch body and the other end of which projects laterally out of the cage body and is in the form of a loop intended to act as a finger piece in manipulating the perch body from the exterior of the cage, that portion of said wire intermediate the finger piece and the perch body being doubled upon itself to present leg portions arranged in a common plane side by side and inserted in the vertically facing socket of the keeper, said leg portions fitting the side portions of the keeper to prevent lateral dislocation of the spring support therein, and said leg portions constituting a comparatively stiff shank portion intermediate the ends of the spring support.

4. In a bird cage, the combination with the cage body of a sheet metal mounting plate attached to the wall of the cage body at one side thereof and having a keeper presenting a vertically facing socket, said keeper being formed by an integral portion struck up from the plate intermediate the upper and lower ends of the latter, said keeper being of wedge-shaped formation and having downwardly converging side walls, a perch body located within the cage body, and a spring support for the perch body comprising a spring wire connected to the perch body at one end of the latter, the wire being bent to present a doubled portion creating a shank adapted to be inserted in said keeper, said doubled portion comprising downwardly converging wire parts adapted to conform to and fit within the side walls of the keeper.

5. In a bird cage, the combination with a cage body of a mounting plate on the side wall of the cage body constructed of sheet metal and having a keeper with a vertically facing socket, said keeper being struck up from the plate and relatively shallow, a spring wire portion within the keeper at one side thereof engaging the side wall of the keeper, a spring wire portion integral with the first-named spring wire portion at the lower part thereof, located within the keeper and engaging the opposite side wall thereof, a manipulating member integral with one of said spring wire portions at the upper part thereof and projecting laterally outside of the cage body, a perch-supporting member integral with the other spring wire portion at the upper part thereof projecting inwardly into the cage body, and a perch body located within the cage body and supported by said perch-supporting member.

ROBERT S. OLIVER.